United States Patent
Arimilli et al.

(12) 
(10) Patent No.: US 6,336,169 B1
(45) Date of Patent: Jan. 1, 2002

(54) BACKGROUND KILL SYSTEM BUS TRANSACTION TO OPTIMIZE COHERENCY TRANSACTIONS ON A MULTIPROCESSOR SYSTEM BUS

(75) Inventors: Ravi Kumar Arimilli; James Steven Fields, Jr.; Guy Lynn Guthrie, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/437,199

(22) Filed: Nov. 9, 1999

(51) Int. Cl.[7] ............................................. G06F 12/08
(52) U.S. Cl. .................. 711/144; 711/145; 711/146
(58) Field of Search ................................ 711/122, 121, 711/143, 144, 145, 146

(56) References Cited

U.S. PATENT DOCUMENTS

| | | | | |
|---|---|---|---|---|
| 5,398,325 A | * | 3/1995 | Chang et al. ................. | 711/3 |
| 5,506,967 A | * | 4/1996 | Barajas et al. ............... | 711/118 |
| 5,553,263 A | * | 9/1996 | Kalish et al. ................ | 711/127 |
| 6,070,166 A | * | 5/2000 | Whittaker et al. .......... | 707/101 |
| 6,073,212 A | * | 6/2000 | Hayes et al. ................. | 711/122 |

\* cited by examiner

Primary Examiner—Hiep T. Nguyen
(74) Attorney, Agent, or Firm—Casimer K. Salys; Bracewell & Patterson, L.L.P.

(57) ABSTRACT

A method of maintaining cache coherency when a value is shared in one or more caches and an invalidation request for the corresponding memory block is issued, by sending a combined response to a requesting device indicating that it may proceed with a requested transaction, and reissuing the invalidation request in a background manner to any cache which responded with a shared/busy response. The invalidation request may be placed in a background kill queue, and later bus transactions compared with entries of the background kill queue to maintain the integrity of the target memory block. The requesting device's processor may continue to perform subsequent loads and stores to the line while other devices must wait for the background kill to complete before receiving control of the line.

22 Claims, 4 Drawing Sheets

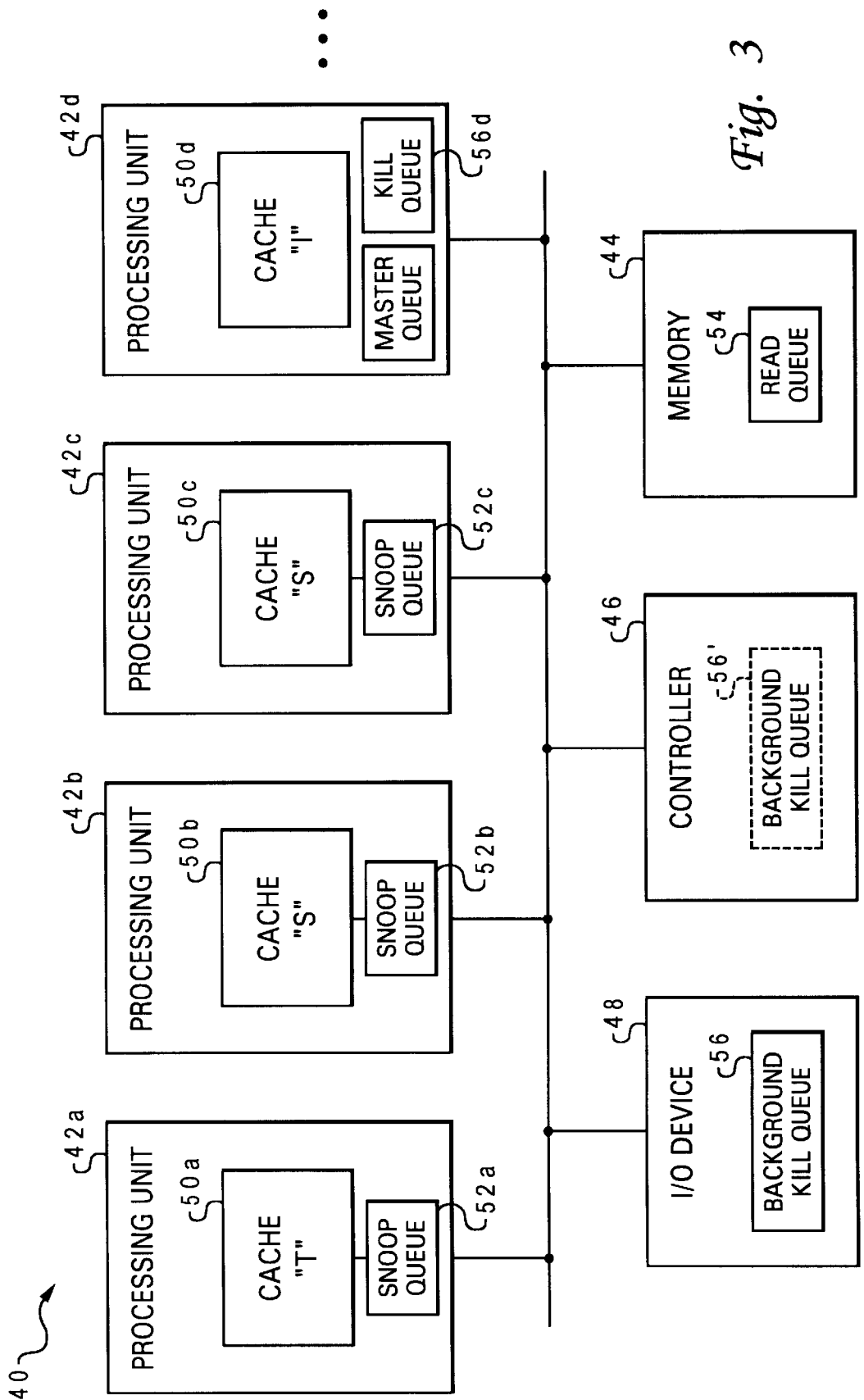

BACKGROUND KILL SYSTEM BUS TRANSACTION TO OPTIMIZE COHERENCY TRANSACTIONS ON A MULTIPROCESSOR SYSTEM BUS

BACKGROUND OF THE INVENTION

1. Field of the Invention

The present invention generally relates to computer systems, specifically to a method of maintaining cache coherency in a multi-processor computer system, and more particularly to an improved cache coherency protocol which allows shared cache lines to be invalidated in a background manner so as not to delay certain other pending cache transactions.

2. Description of Related Art

The basic structure of a conventional multi-processor computer system 10 is shown in FIG. 1. Computer system 10 has several processing units, two of which 12a and 12b are depicted, which are connected to various peripheral devices, including input/output (I/O) devices 14 (such as a display monitor, keyboard, graphical pointer (mouse), and a permanent storage device or hard disk), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20, or direct memory access channels (not shown). Computer system 10 may have many additional components which are not shown, such as serial, parallel, and universal system bus (USB) ports for connection to, e.g., modems, printers or scanners. There are other components that might be used in conjunction with those shown in the block diagram of FIG. 1; for example, a display adapter might be used to control a video display monitor, a memory controller can be used to access memory 16, etc. The computer can also have more than two processing units.

In a symmetric multi-processor (SMP) computer, all of the processing units are generally identical, that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corp. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the additional latency of loading the values from memory 16. These caches are referred to as "on-board" when they are integrally packaged with the processor core on a single integrated chip 28. Each cache is associated with a cache controller (not shown) that manages the transfer of data and instructions between the processor core and the cache memory.

A processing unit can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels (L3, L4, etc.) of serially connected caches.

In a multi-level cache, if a copy of a value is in every level of the cache, the cache hierarchy is referred to as being "inclusive." It is not necessary, however, to keep a copy of each value in the lower levels, and an inclusivity bit field may be added to the caches to indicate whether or not the cache is inclusive. For example, a three-level cache structure might provide an L3 cache which was not inclusive, such that a value residing in the L2 cache might not be present in the L3 cache. In this example, if an L2 cache issues a read command for a value that is not present in any of the caches of that processing unit, it can be passed to that L2 cache without (necessarily) loading it into the L3 cache.

In an SMP computer, it is important to provide a coherent memory system, that is, to cause write operations to each individual memory location to be serialized in some order for all processors. By way of example, assume a location in memory is modified by a sequence of write operations to take on the values: 1, 2, 3, 4. In a cache coherent system, all processors will observe the writes to a given location to take place in the order shown. However, is possible for a processing element to miss a write to the memory location. A given processing element reading the memory location could see the sequence 1, 3, 4, missing the update to the value 2. A system that implements these properties is said to be "coherent". Nearly all coherency protocols operate only to the granularity of the size of a cache block. That is to say, the coherency protocol controls the movement of and write permissions for operand data or instructions on a cache block basis, and not separately for each individual memory location.

There are a number of protocols and techniques for achieving cache coherence that are known to those skilled in the art. All of these mechanisms for maintaining coherency require that the protocols allow only one processor to have a "permission" that allows a write operation to a given memory location (cache block) at any given point in time. As a consequence of this requirement, whenever a processing element attempts to write to a memory location, it must first inform all other processing elements of its desire to write the location and receive permission from all other processing elements to carry out the write.

To implement cache coherency in a system, the processors communicate over a common generalized interconnect (i.e., bus 20). The processors pass messages over the interconnect indicating their desire to read from or write to memory locations. When an operation is placed on the interconnect, all of the other processors "snoop" (monitor) this operation and decide if the state of their caches can allow the requested operation to proceed and, if so, under what conditions. There are several bus transactions that require snooping and follow-up action to honor the bus transactions and maintain memory coherency. The snooping operation is triggered by the receipt of a qualified snoop request, generated by the assertion of certain bus signals. Instruction processing is interrupted only when a snoop hit occurs and the snoop state machine determines that an additional cache snoop is required to resolve the coherency of the offended sector.

This communication is necessary because, in systems with caches, the most recent valid copy of a given block of memory may have moved from the system memory 16 to one or more of the caches in the system (as mentioned above). If a processor (say 12a) attempts to access a memory location not present within its cache hierarchy, the correct version of the block, which contains the actual (current) value for the memory location, may either be in the system memory 16 or in one of more of the caches in another processing unit, e.g. processing unit 12b. If the correct version is in one or more of the other caches in the system, it is necessary to obtain the correct value from the cache(s) in the system instead of system memory.

For example, consider a processor, say 12a, attempting to read a location in memory. It first polls its own L1 cache (24 or 26). If the block is not present in the L1 cache, the request is forwarded to the L2 cache (30). If the block is not present in the L2 cache, the request is forwarded on to lower cache levels, e.g., the L3 cache. If the block is not present in the lower level caches, the request is then presented on the generalized interconnect (20) to be serviced. Once an operation has been placed on the generalized interconnect, all other processing units snoop the operation and determine if the block is present in their caches. If a given processing unit has the block requested by processing unit in its L1 cache, and the value in that block is modified, and any lower level caches also have copies of the block, then their copies are stale, since the copy in the processor's cache is modified. Therefore, when the lowest level cache (e.g., L3) of the processing unit snoops the read operation, it will determine that the block requested is present and modified in a higher level cache. When this occurs with an in-line cache structure, the L3 cache places a message on the generalized interconnect informing the processing unit that it must "retry" it's operation again at a later time, because the actual value of the memory location is in the L1 cache at the top of the memory hierarchy and must be retrieved to make it available to service the read request of the initiating processing unit.

Once the request from an initiating processing unit has been retried, the L3 cache begins a process to retrieve the modified value from the L1 cache and make it available at the L3 cache, main memory or both, depending on the exact details of the implementation. To retrieve the block from the higher level caches, the L3 cache sends messages through the inter-cache connections to the higher level caches, requesting that the block be retrieved. These messages propagate up the processing unit hierarchy until they reach the L1 cache and cause the block to be moved down the hierarchy to the lowest level (L3 or main memory) to be able to service the request from the initiating processing unit.

The initiating processing unit eventually re-presents the read request on the generalized interconnect. At this point, however, the modified value has been retrieved from the L1 cache of a processing unit and placed into system memory, and the read request from the initiating processor will be satisfied. The scenario just described is commonly to as a "snoop push". A read request is snooped on the generalized interconnect which causes the processing unit to "push" the block to the bottom of the hierarchy to satisfy the read request made by the initiating processing unit.

Thus, when a processor wishes to read or write a block, it must communicate that desire with the other processing units in the system in order to maintain cache coherence. To achieve this, the cache coherence protocol associates with each block in each level of the cache hierarchy, a status indicator indicating the current "state" of the block. The state information is used to allow certain optimizations in the coherency protocol that reduce message traffic on the generalized interconnect and the inter-cache connections. As one example of this mechanism, when a processing unit executes a read it receives a message indicating whether or not the read must be retried (i.e., reissued later). If the read operation is not retried, the message usually also includes information allowing the processing unit to determine if any other processing unit also has a still active copy of the block (this is accomplished by having the other lowest level caches give a "shared" or "not shared" indication for any read they do not retry). Therefore, a processing unit can determine whether any other processor in the system has a copy of the block. If no other processing unit has an active copy of the block, the reading processing unit marks the state of the block as "exclusive". If a block is marked exclusive it is permissible to allow the processing unit to later write to the block without first communicating with other processing units in the system because no other processing unit has a copy of the block. Therefore, it is possible for a processor to read or write a location without first communicating this intention onto the interconnection, but only where the coherency protocol has ensured that no other processor has an interest in the block.

The foregoing cache coherency technique is implemented in a specific protocol referred to as "MESI," and illustrated in FIG. 2. In this protocol, a cache block can be in one of four states, "M" (Modified), "E" (Exclusive), "S" (Shared) or "I" (Invalid). Under the MESI protocol, each cache entry (e.g., a 32-byte sector) has two additional bits which indicate the state of the entry, out of the four possible states. Depending upon the initial state of the entry and the type of access sought by the requesting processor, the state may be changed, and a particular state is set for the entry in the requesting processor's cache. For example, when a sector is in the Modified state, the addressed sector is valid only in the cache having the modified sector, and the modified value has not been written back to system memory. When a sector is Exclusive, it is present only in the noted sector, and is consistent with system memory. If a sector is Shared, it is valid in that cache and in at least one other cache, all of the shared sectors being consistent with system memory. Finally, when a sector is Invalid, it indicates that the addressed sector is not resident in the cache. As seen in FIG. 2, if a sector is in any of the Modified, Shared or Invalid states, it can move between the states depending upon the particular bus transaction. While a sector in an Exclusive state can move to any other state, a sector can only become Exclusive if it is first Invalid.

A further improvement in accessing cache blocks can be achieved using the cache coherency protocol. This improvement, referred to as "intervention," allows a cache having control over a memory block to provide the data in that block directly to another cache requesting the value (for a read-type operation), in other words, bypassing the need to write the data to system memory and then have the requesting processor read it back again from memory. Intervention can generally be performed only by a cache having the value in a block whose state is Modified or Exclusive. In both of these states, there is only one cache block that has a valid copy of the value, so it is a simple matter to source (write) the value over the bus 20 without the necessity of first writing it to system memory. The intervention procedure thus speeds up processing by avoiding the longer process of writing to and reading from system memory (which actually involves three bus operations and two memory operations). This procedure not only results in better latency, but also increased bus bandwidth.

There are many variations of the MESI protocol. The tagged ("T") state is used to identify a cache block which is inconsistent with system memory (i.e., modified) and is further responsible for writing the correct (current) value to memory upon deallocation (or to pass on the tag to another cache block during intervention). The T state can be used to share a modified value, by marking one of the sharing blocks as (temporarily) responsible for maintaining a valid copy of the value. The recently read ("R") state can be used to allow intervention when the value is unmodified but shared among many caches, so as to conveniently mark a single one of the sharing caches as being responsible for intervention. The hover ("H") state allows a cache line to maintain an address in the directory even though the corresponding value in the cache entry array is an invalid copy, so that it can snoop the correct value for its processing unit if the value happens to be broadcast as part of an intervention between the caches of two other processing units.

A cache transaction may require any caches which currently contain a value to invalidate the corresponding cache lines. For example, when a processor or I/O device issues a store operation for a particular memory block, any caches which have earlier copies of the block must invalidate, or "kill," those cache lines. Invalidation is similarly performed for a read-with-intent-to-modify (RWITM) transaction. Prior art instruction sets also include a transaction, such as the PowerPC™ "DClaim" bus transaction, that is used to claim a memory block in anticipation of a later store operation, which again requires invalidation of any currently valid lines.

The requirement to kill old cache lines can lead to inefficiencies, particularly when a memory block is held in a shared fashion among several caches. If a cache issues a transaction requiring invalidation, one cache may issue a snoop response indicating that the first cache could proceed but, in the prior art, the cache (master) must wait for responses from all caches which contain the target block. Thus, if a first snoop response indicates that a value was held in the S, R or T states, the master must wait before completing its transaction until it receives confirmation from all caches, since the first snoop response inherently signifies that there are other cache lines that must be properly invalidated (in contrast to an M or E state response which would indicate that no other caches contain the target block). Oftentimes these other caches cannot immediately provide a snoop response, due to full snoop queues or other cache activity, and so a retry message is sent instead. The master must then reissue the request, sometimes repeatedly, before all of the snoop responses are collected, delaying the master transaction. This delay is typically unnecessary, except in the unusual situation wherein one of the other sharing caches is issuing a contemporaneous transaction directed to the same block, in which case the contemporaneous transaction would conflict with the primary invalidation request.

In light of the foregoing, it would be desirable to provide a method of handling cache transactions which did not require an initiating device to wait for unnecessary cache responses. It would be further advantageous if the method could protect the cache line involved so that no other master can access the line in a conflicting manner.

SUMMARY OF THE INVENTION

It is therefore one object of the present invention to provide an improved method of maintaining cache coherency in a multi-processor system.

It is another object of the present invention to provide such a method which allows an invalidation request to proceed without waiting for unnecessary coherency responses.

It is yet another object of the present invention to provide an improved method of handling invalidation bus transactions in a memory hierarchy of a computer system while ensuring the integrity of target memory blocks.

The foregoing objects are achieved in a method of maintaining cache coherency in a multi-processor computer system, comprising the steps of loading a value which corresponds to a memory block of a system memory device into a plurality of cache lines of respective caches, issuing an invalidation request from a master device, receiving a snoop response from at least one of the caches indicating that the responding cache contained a shared copy of the value that it is unable to invalidate (i.e., queue full), sending a combined response to the master device indicating that the master device may proceed with a requested transaction, and reissuing the invalidation request to any cache which responded with the shared response. The master device may be one of the caches, or an input/output device of the computer system. The reissuing of the invalidation request may be performed by a system controller of the computer system, or by the master device. In a preferred embodiment, the invalidation request is placed in a background kill queue in the master device, and later bus transactions are compared with entries of the master device's background kill queue to maintain the integrity of the target memory block. The master device can perform subsequent loads or stores to a block that is in its own kill queue (i.e., a cache line is in the "M" state), but other caches must not be allowed access to this line until it has been removed from the kill queue (i.e., all stale shared copies must be invalidated from the system before another cache can be given a copy).

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 3 is a block diagram of one embodiment of a multi-processor computer system constructed in accordance with the present invention, depicting the use of a background kill queue to handle background invalidation transactions;

DESCRIPTION OF AN ILLUSTRATIVE EMBODIMENT

Figure 1:
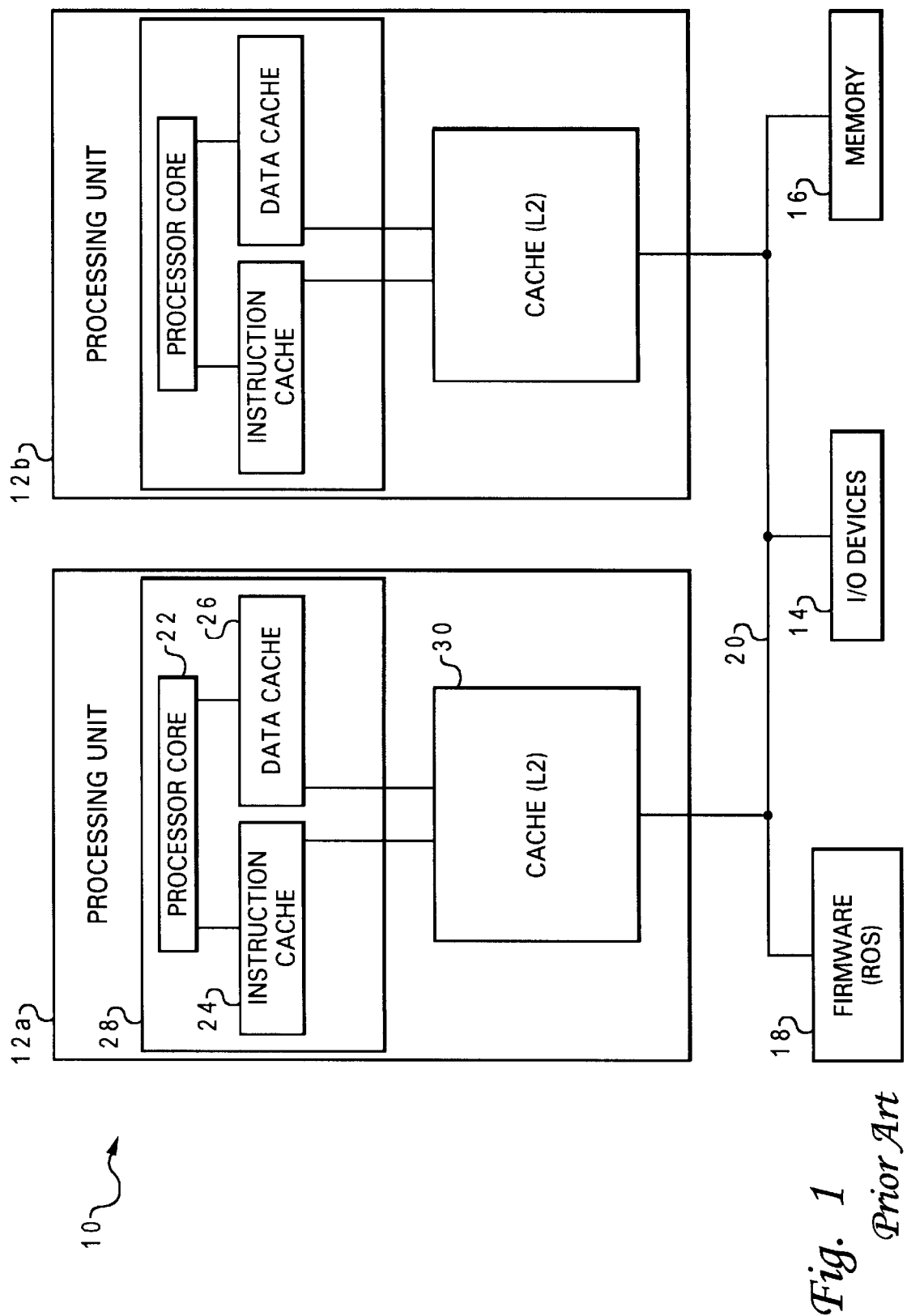
FIG. 1 is a block diagram of a prior art multi-processor computer system.

With reference now to the figures, and in particular with reference to FIG. 3, there is depicted one embodiment 40 of a multi-processor computer system constructed in accordance with the present invention. Computer system 40 includes a plurality of processing units (four of which 42a, 42b, 42c, and 42d are depicted), a system memory device 44, a system or memory controller 46, and a plurality of input/output (I/O) devices (one of which 48 is depicted). Controller 46 may be physically integrated into memory device 44. The present invention is directed to a method of handling cache operations in a memory-coherent, multi-processor system such as the system of FIG. 3, but the present invention could be applied to computer systems that have additional hardware components not shown in FIG. 3, or having a different interconnection architecture (or both), so those skilled in the art will appreciate that the present invention is not limited to the generalized system shown in that figure.

The novel cache coherency mechanism of the present invention is utilized when a value (i.e., an instruction or operand data) having an address corresponding to a memory block in system memory 44 is shared among one or more processing units. The cache lines sharing the value may be assigned one of several coherency states depending upon the particular implementation, including the shared (S) state, the recently-read (R) state, or the tagged (T) state, all of which are discussed above in the Background. In the example depicted in FIG. 3, the value is shared by three of the processing units illustrated, with processing unit 42a having the corresponding cache line in the T state, while processing units 42b and 42c have the cache lines in the S state. Processing unit 42d does not have a valid copy of the line, i.e., the state of the corresponding line there is invalid (I). Although FIG. 3 illustrates only a single cache for a given processing unit, it is understood that the present invention could be applied to multi-level cache hierarchies, e.g., the depicted caches 50a, 50b and 50c could all be on-board (L1) caches, or they could be L2 or L3 caches.

The present invention results in more efficient processing by avoiding delays which might otherwise arise as a result of unnecessary bus transactions associated with an invalidation request that is directed to a target memory block currently shared in one or more caches. The invalidation request may originate from one of several operations, including a write (store) operation, a read-with-intent-to-modify (RWITM) operation, or other operations such as the PowerPC™ DClaim instruction. When such an invalidation request is issued, for example, from a cache 50d, it will trigger snoop responses from each of the other caches. Each cache has a respective snoop queue 52a, 52b, 52c which stores cache operations snooped from other devices until the respective cache is able to respond to the operation. Snoop responses vary depending upon the state of the corresponding cache line in the cache, the activity status of the cache, and the availability of the snoop queue.

Figure 4:
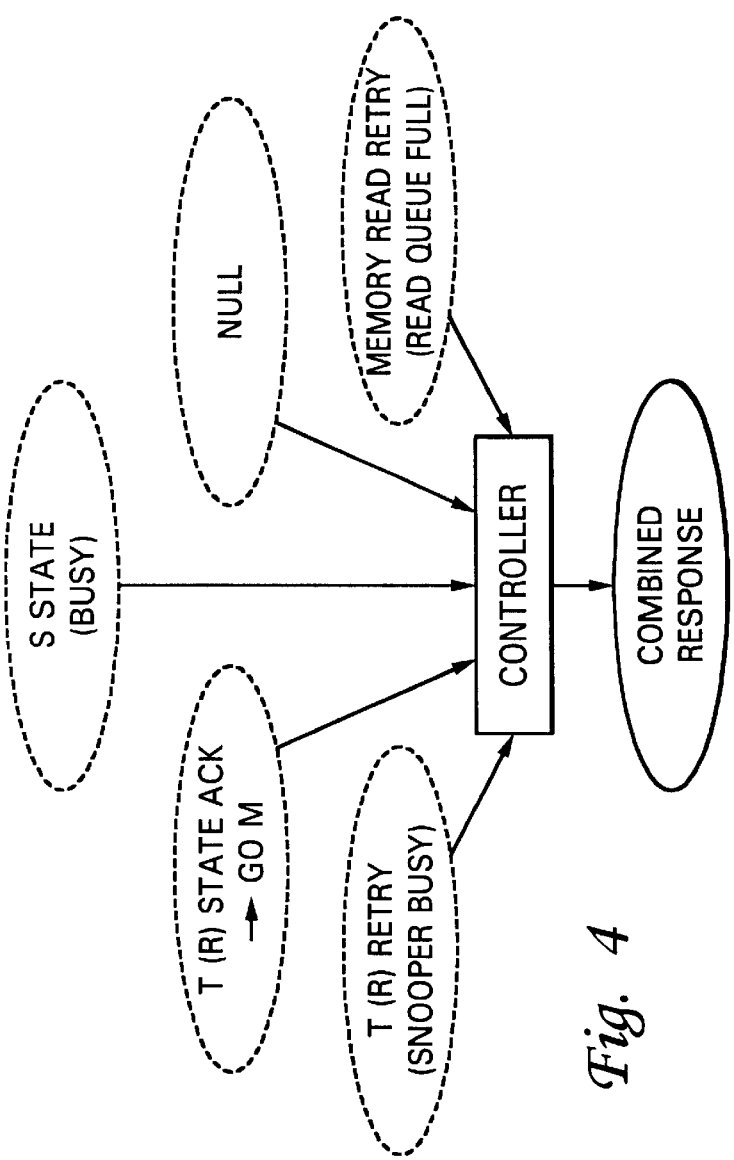
FIG. 4 is a pictorial representation of cache snoop responses which are collected to form a combined response in accordance with the present invention, wherein the responses may include a retry response used when a snooping device is busy and unable to handle a requested cache operation.
Figure 2:
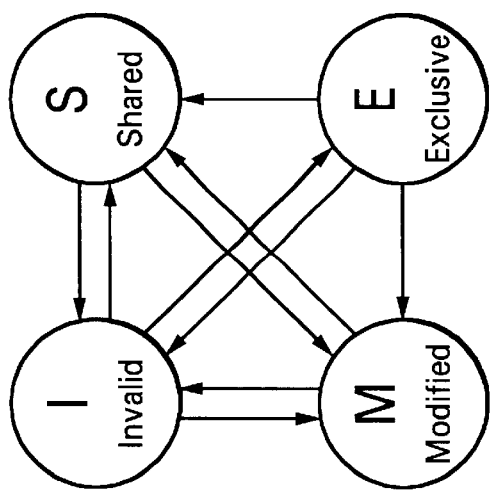
FIG. 2 is a state diagram depicting a prior art cache coherency protocol (MESI)

FIG. 4 illustrates several exemplary snoop responses, and how these responses are collected by controller 46 to form a combined response. The snoop responses may include, among others: a "null" (or "clean") response, indicating that the cache does not currently have a (valid) copy of the memory block, or that it can invalidate the block immediately; a T (or R) state acknowledge response, indicating that the cache has the shared value and holds a token to uniquely distinguish it from other sharing caches, in which case the requesting device can assign the modified (M) state to the newly acquired cache line; a shared/busy state response, indicating that the cache has the shared value with no token and that it cannot immediately invalidate, in which case a subsequent background kill must occur if the requested line succeeds in being assigned to M; a first type of retry response which occurs when the T (or R) snooper is busy (or its snoop state is unknown); and a second type of retry response which occurs when a read queue 54 of memory device 44 is full and so is unable to currently retrieve read data.

The combined response is prepared by controller 46 and forwarded to the requesting master (cache 50d, in this example). The present invention particularly relates to the condition wherein at least one of the snoop responses indicates that the target block is currently shared in at least one cache that is unable to invalidate the block immediately. If the retry response is of the second type noted above, wherein the read queue 54 of memory device 44 is unable to receive the read data and there is no acknowledgement from a snooper in the T (or R) state assigning the new master to M, then it is necessary to reissue the transaction. If the retry response is of the first type noted above, wherein the T (or R) snooper is busy (or its snoop state is unknown), then it is also necessary to reissue the transaction. However, if the response indicates an "S state (busy)" response and either (a) a T (or R) acknowledge is received, or (b) no T (or R) state retry is received and no "memory read retry" is received, then the present invention advantageously issues a combined response to the master allowing it to proceed with the transaction, even though other caches may not yet have invalidated the corresponding cache lines. In such a situation, cache 50d will further issue a novel "background kill" operation through a kill queue 56d to handle any such "S state (busy)" responses.

The background kill operation is preferably placed in a master queue, such as a master queue 58d associated with processing unit 42d. Cache 50d then re-broadcasts the invalidation request until all snooping devices have responded with non-shared/busy responses (i.e., null responses), thereby confirming that any previously shared lines have been properly invalidated. The background kill operation may be selectively broadcast only to those snooping devices which have not already responded with a non-shared/busy response. Thus, the background kill operation may be reissued to a given snooping device several times, but the master device is immediately allowed to proceed as if all sharing devices had already invalidated the target block, by allowing the master's processor to perform load and store operations to the line.

In the exemplary embodiment, the background kill operation is handled by the initiating master, but it could alternatively be handled by the system controller, e.g., controller 46 could re-broadcast the background kill operation after proceeding with the original transaction. In such a case, controller 46 could also be provided with a background kill queue 56'. In either embodiment, the agent responsible for issuing the background kill protects the target block to ensure that no other master (other than the master associated with the transaction that caused the background kill) can access the cache line until it has been properly invalidated. This assurance can be provided by comparing later bus transactions against the background kill entries pending in queue 56d. If a transaction is directed to the same target block as a pending background kill operation, the transaction is retried.

In a further implementation of the present invention, one snooping device may provide a requested value via intervention, and invalidation may be handled using the background kill mechanism. For example, if a master issues RWITM instruction, a cache containing the value in the R or T state can intervene, and the master can proceed with the sourced value.

Figure 5:
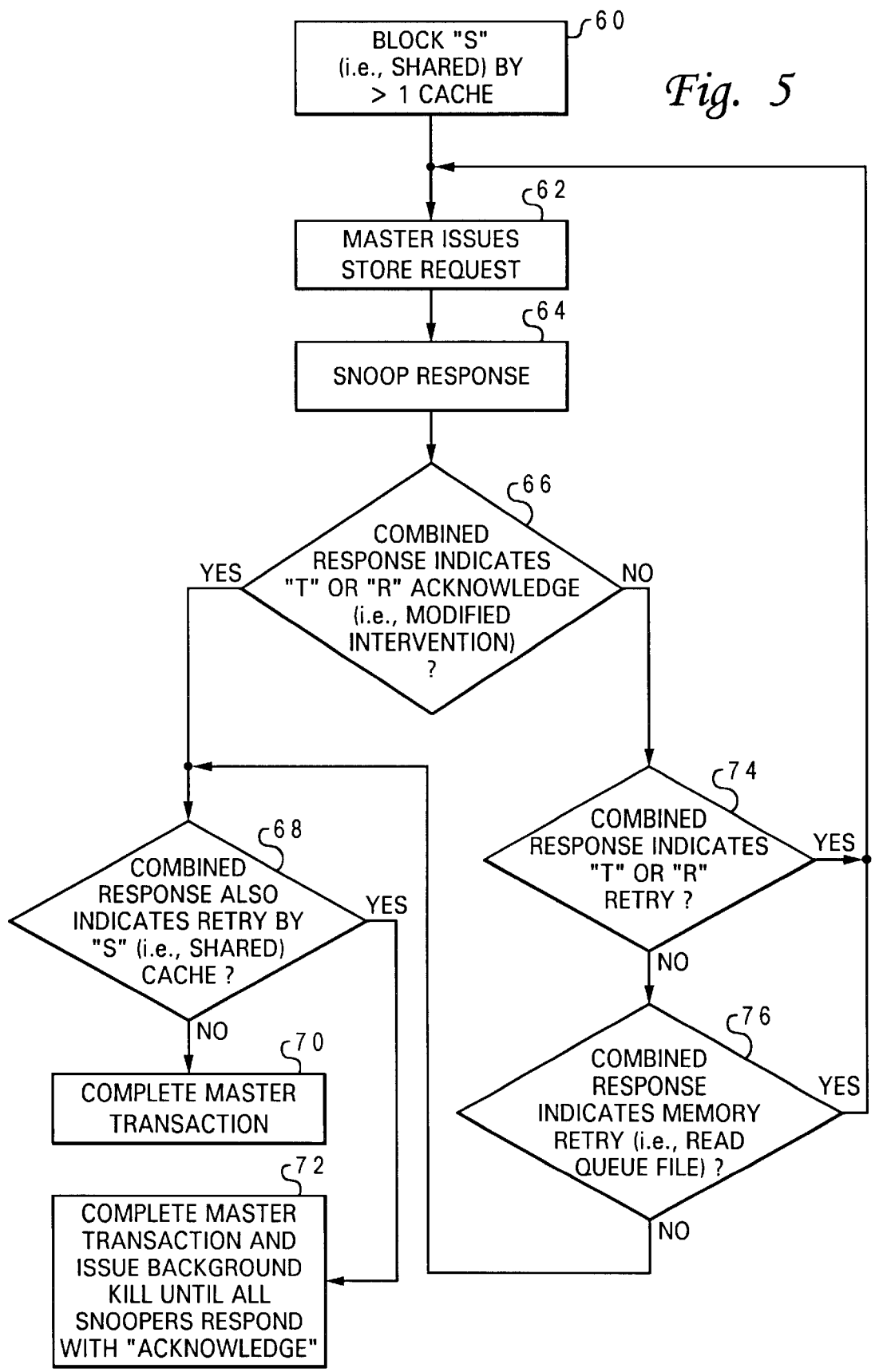
FIG. 5 is a chart of the logic flow in accordance with one implementation of the present invention.

FIG. 5 illustrates the logic flow associated with the foregoing illustrative embodiment. As noted, the invention only applies when a memory block is shared by at least one cache (60). A master issues a store request (62), and snoop responses are gathered to form a combined response (64). A determination is then made as to whether the combined response indicates a T (or R) acknowledge, i.e., modified intervention (66). If so, then a further determination is made as to whether the combined response also indicates a retry by an S state cache (68); if not, the master transaction is conventionally completed (70), but if so, the master transaction is completed along with the issuance of the background kill operation until such time as all snoopers have responded with an acknowledge (72). If the determination of step 66 indicates that the combined response does not indicate a T (or R) acknowledge, a further determination is made as to whether it indicates a T (or R) retry (74); if so, the request must be retried (returning to step 62), but if not, yet another determination is made as to whether the combined response indicates a memory retry, i.e., read queue full (76). If so, the master must again retry the request, but if not the process proceeds to step 68.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of maintaining cache coherency in a multi-processor computer system wherein each of a plurality of processing units has at least one cache, comprising the steps of:
   loading a value which corresponds to a memory block of a system memory device into a plurality of cache lines of respective caches;
   issuing an invalidation request from a master device;
   receiving a shared/busy response from at least one cache, in response to said issuing step, wherein the shared/busy response indicates that the cache contains a shared copy of the value and is unable to immediately invalidate a corresponding cache line; and
   sending a combined response to the master device indicating that the master device may proceed with a requested transaction.

2. The method of claim 1 further comprising the step of reissuing the invalidation request to any cache which responded with the shared/busy response.

3. The method of claim 1 wherein said sending step is performed in response to the further step of determining that either (a) an intervention acknowledge signal is received, or (b) no intervention retry is received and no system memory retry is received.

4. The method of claim 2 wherein said reissuing step is performed by a system controller of the computer system.

5. The method of claim 2 wherein said reissuing step is performed by the master device.

6. The method of claim 2 wherein said reissuing step includes the step of placing the invalidation request in a background kill queue.

7. The method of claim 6 further comprising the step of comparing later bus transactions with entries of the background kill queue.

8. The method of claim 1 further comprising the step of assigning one or more cache coherency states to the plurality of cache lines indicating that the cache lines share the value.

9. The method of claim 8 wherein said assigning step assigns a shared coherency state indicating that at least one of the cache lines has the shared value and is not to be used for intervention.

10. The method of claim 9 wherein said assigning step further assigns a recently read coherency state indicating that at least one other cache line has the shared value and is to be used for intervention, and further that the shared value is consistent with a system memory device.

11. The method of claim 9 wherein said assigning step further assigns a tagged coherency state indicating that at least one other cache line has the shared value and is to be used for intervention, and further that the shared value is not consistent with a system memory device.

12. A computer system comprising:
   a system memory device;
   a plurality of processing units each having a cache;
   bus means for interconnecting said system memory device and said processing units; and
   cache coherency means for receiving snoop responses from said caches in response to a invalidation request from a master device, said snoop responses including at least a shared/busy response indicating that a cache contains a shared copy of a value corresponding to a target of the invalidation request and that the cache is unable to immediately invalidate a corresponding cache line, wherein said cache coherency means further sends a combined response to said master device indicating that said master device may proceed with a requested transaction.

13. The computer system of claim 12 wherein said cache coherency means further reissues the invalidation request to any cache which responded with the shared/busy response.

14. The computer system of claim 12 wherein said master device is one of said caches.

15. The computer system of claim 12 wherein said master device is an input/output device of the computer system.

16. The computer system of claim 12 wherein said cache coherency means sends the combined response after determining that either (a) an intervention acknowledge signal is received, or (b) no intervention retry is received and no system memory retry is received.

17. The computer system of claim 12 wherein said cache coherency means further places the invalidation request in a background kill queue.

18. The computer system of claim 17 wherein said cache coherency means further compares later bus transactions with entries of said background kill queue.

19. The computer system of claim 12 wherein said cache coherency means further assigns one or more cache coherency states to a plurality of cache lines of respective caches indicating that said cache lines share the value.

20. The computer system of claim 19 wherein said cache coherency means assigns a shared coherency state indicating that at least one of said cache lines has the shared value and is not to be used for intervention.

21. The computer system of claim 20 wherein said cache coherency means also assigns a recently read coherency state indicating that at least one other of said cache lines has the shared value and is to be used for intervention, and further that the shared value is consistent with a system memory device.

22. The computer system of claim 20 wherein said cache coherency means also assigns a tagged coherency state indicating that at least one other of said cache lines has the shared value and is to be used for intervention, and further that the shared value is not consistent with a system memory device.

* * * * *